April 15, 1969   J. O. McMILLAN ET AL   3,438,644
SHOPPING CART MOUNTED ASH RECEPTACLE
Filed Jan. 23, 1967   Sheet 1 of 2
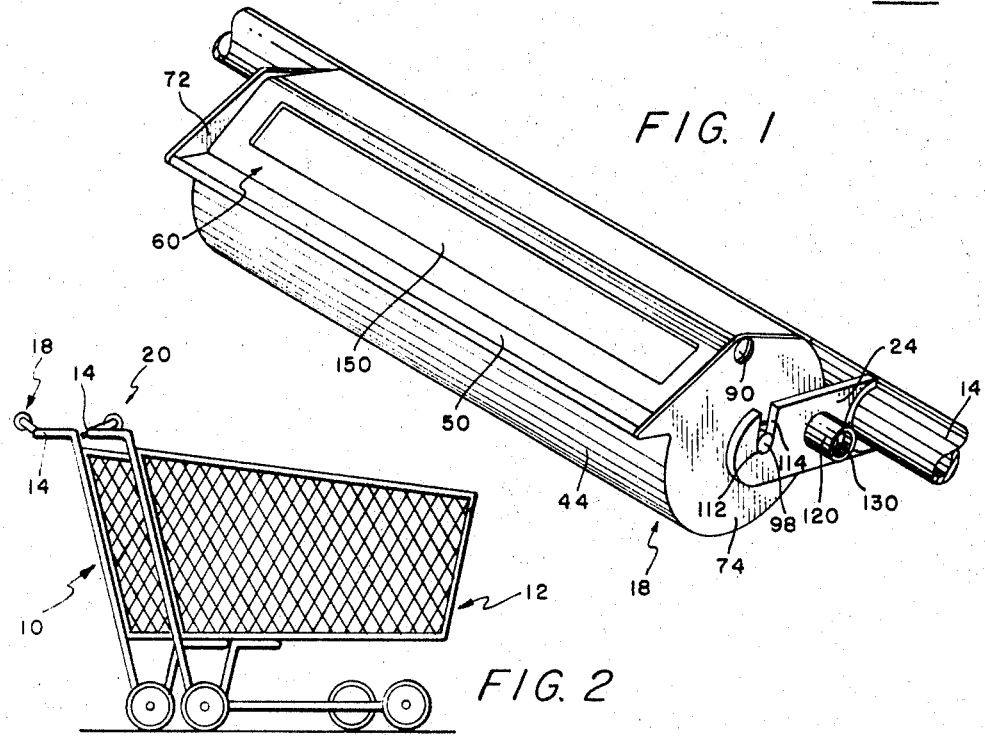
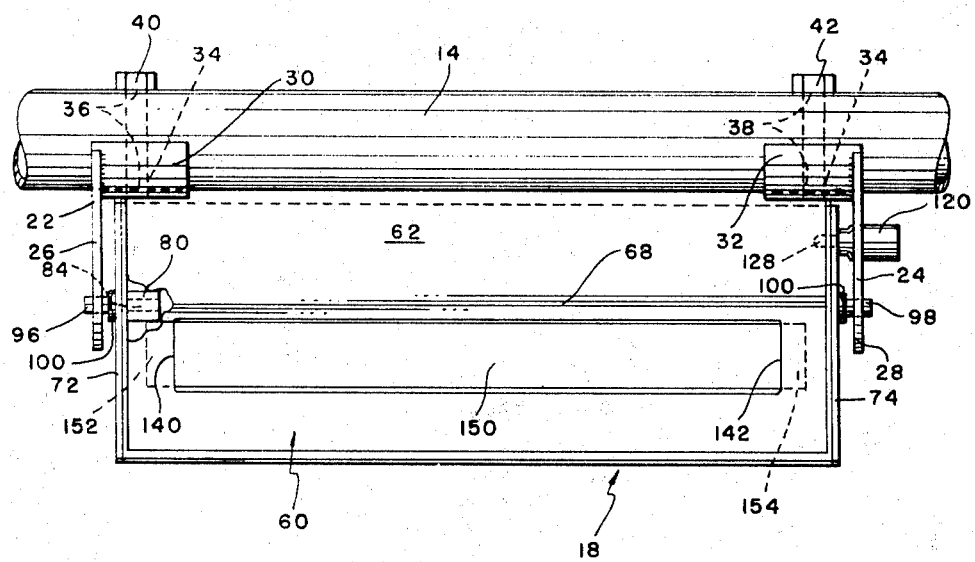
INVENTOR.
JAMES O. McMILLAN
ROBERT W. KAPLAN
ATTORNEY April 15, 1969  J. O. McMILLAN ET AL  3,438,644
SHOPPING CART MOUNTED ASH RECEPTACLE
Filed Jan. 23, 1967  Sheet 2 of 2

INVENTOR.
JAMES O. McMILLAN
ROBERT W. KAPLAN

ATTORNEY

3,438,644
SHOPPING CART MOUNTED ASH RECEPTACLE
James O. McMillan, 2225 Manhattan Drive 67204, and Robert W. Kaplan, 430 N. Market 67202, both of Wichita, Kans.
Filed Jan. 23, 1967, Ser. No. 611,163
Int. Cl. B62b *5/00, 11/00*
U.S. Cl. 280—33.99      12 Claims

ABSTRACT OF THE DISCLOSURE

The mounting of an ash receptacle on the transfer push bar handle at the upper rear end of a self-service, nesting type, shopping cart in such a manner not to interfere with the nesting of such carts, with such receptacles being mounted to oscillate between positions for receiving and emptying ashes, with the provision of a common means for selectively preventing or making difficult both the unauthorized emptying of or removal of the receptacle from the cart. The receptacle is disposed on the cart to be in front of the user of the cart for convenience in depositing ashes and has means thereon for securing an indicia bearing medium in the view of such user.

---

The present invention relates to an improved ash receptacle, and more particularly to an ash receptacle oscillatably mounted between receiving and discharging positions, with means being provided for selectively securing the receptacle in ash receiving position and also preferably making theft or removal of the receptacle from a support difficult. A highly advantageous combination of the invention comprises the mounting of the receptacle on a nesting type of shopping cart in a position conspicuously exposed to view and accessible to use by the cart user that does not interfere with the nesting of the cart.

As is well known an ever increasing form of merchandising involves a customer being freely allowed into an area of display of goods and being allowed to select and take selected merchandise to a check-out stand located at an exit from the area where the total amount of the selections is determined and such amount paid to the merchant. To convenience the customer, the merchant provides for use of the customer a wheeled shopping cart which the customer can push before him as he passes displays of merchandise, into which he can place his selections, and which he can use to transport his selections to the check-out stand.

Since the merchant must have sufficient carts to meet peak customer needs, such carts are usually of the nesting type to conserve space requirements for storage and to enable an employee to move a plurality thereof at a time; all as well known.

It has been found that placement of ash receptacles for customer use at various locations about a merchandise display area has been far from satisfactory from the standpoint of the merchant insofar as customers making exclusive use of the receptacles for the disposition of cigar, cigarette and pipe ashes, not to mention discarded cigar and cigarette butts. Such nonuse of receptacles provided results in not only untidy floors, but is often accompanied by such objectionable practices on the part of customers of ashes and butts being placed on displayed merchandise on shelves supporting the latter. For example, in so-called food supermarkets, customers may grind out or extinguish a cigarette on the lid or cover of canned goods. This is, of course, revolting or disgusting to subsequent beholders of the mess, tends to spoil a potential purchase, and may even result in loss of customer patronage. Unfortunately, such thoughtless conduct (usually furtive in the sense that the customer hesitates to drop the cigarette on the floor as this is more easily observed) on the part of the customer creates a more objectionable result from the merchant's viewpoint because of its greater offensiveness to other customers, possibly damage to goods, and because the mess is less readily subject to discovery and then usually more difficult to clean up. The increase in fire hazard is abundantly clear as many goods or their containers or wrappers are not fireproof.

In vying for customer patronage and to create better employee working conditions, merchants are to an increasing extent carpeting or otherwise providing soft floor coverings for the aisles, passageways and corridors over which the shopping cart is pushed by merchandise displays. With such trend the problems alluded to above that are created by the smoking habit of customers, especially the discarding of ashes and butts, becomes a great deal more vexing. Whereas hard or uncushioned floors could and usually were of materials that are smooth, resistant to cigarette burns, water washable, and quickly dryable for use; the use of carpeting or floor covering materials that are soft or cushion-like greatly increases such problems. While floor coverings may be fireproof or fire resistant at least insofar as a lighted cigarette thereon starting a fire, many of such materials are susceptible to damage thereby nonetheless such as by discoloration, fusion, etc. Furthermore, the typical porous, foraminous or open character of such materials makes cleaning more difficult as well as the replacement of a damaged portion. Also such materials when wetted during liquid cleaning can be dried or readied for use only after a considerable lapse of time.

It is, therefore, a prime objective of the present invention to encourage customer use of provided ash receptacles, and thereby to lessen objectionable practices by smokers mentioned above, whereby fire hazards are reduced, greater cleanliness is realizable with less effort, customer patronage is retained and increased, and less damage is caused to merchandise and merchandising facilities; this by providing an ash receptacle for each cart using customer and by maintaining the receptacle provided each cart using customer continuously in his presence.

A closely related object to that set forth in the last paragraph is to provide an ash receptacle that is not readily susceptible to inadvertent dumping and which is resistant to pilferage.

Another important object is to provide an ash receptacle as an attachment for a nesting type shopping cart that will not interfere with the nesting function and which will be exposed to view and access and upon which may be displaced informational matter such as the layout of displayed items, information on specially sale priced items, advertising, etc.

One broad aspect of the invention involves an ash receptacle and mounting means therefor comprising first and second brackets provided with means adapting the brackets to be secured to a support with the brackets in horizontally spaced and fixed relationship to each other, a receptacle including horizontally spaced first and second end walls at opposite extremities thereof, said receptacle being disposed between the brackets and having its first and second end walls juxtaposed with the first and second brackets, respectively, means pivotally mounting the first and second end walls upon the first and second brackets about a common horizontal axis, respectively, whereby the receptacle can be oscillated from an upright to a tilted position, said receptacle having an opening disposed intermediate said end walls whereby ashes may be received in and discharged from the receptacle when the latter is in its upright and tilted positions respectively, and means extending through the first bracket and actuable from the side of the latter remote from the first end wall for selective engagement with the latter for releasably retaining the receptacle in its upright position.

Another broad aspect of the invention has to do with a self-service type shopping cart of the class having a transversely extending horizontal push bar at the upper rear end thereof and of the class such that a plurality thereof can be nested with the push bars thereof in spaced parallelism, and in combination with said cart the improvement comprising first and second brackets mounted in horizontally spaced relation on and extending laterally from the push bar, an ash receptacle including horizontally spaced first and second end walls at opposite extremities thereof, said receptacle being disposed between the brackets and having its first and second end walls juxtaposed with the first and second brackets, respectively, means pivotally mounting the first and second end walls upon the first and second brackets, respectively, about an axis spaced from and parallel to the push bar, whereby the receptacle can be oscillated from an upright to a tilted position, said receptacle having an opening disposed intermediate said end walls whereby ashes may be received in and dumped from the receptacle when the latter is in its upright and tilted positions, respectively, and means for releasably securing the receptacle in its upright position.

Other objectives and aspects of the invention will become apparent as well as important features and advantages during the ensuing description of preferred embodiments of the invention, such description to be taken in conjunction with the accompanying drawings illustrative of such preferred embodiments, wherein:

FIGURE 1 is an isometric view of an ash receptacle according to the present invention shown mounted upon a fragmentary showing of the tubular push bar member of a conventional shopping cart, not shown;

FIGURE 2 is a side elevational view of a pair of nested, nesting type, self-service, wheeled shopping carts, the push bars of such nested carts having ash receptacles such as shown in FIGURE 1 mounted in different positions thereon;

FIGURE 3 is a top plan view of the structure shown in FIGURE 1, certain concealed portions of the structure being shown in dashed outline;

Figure 4:
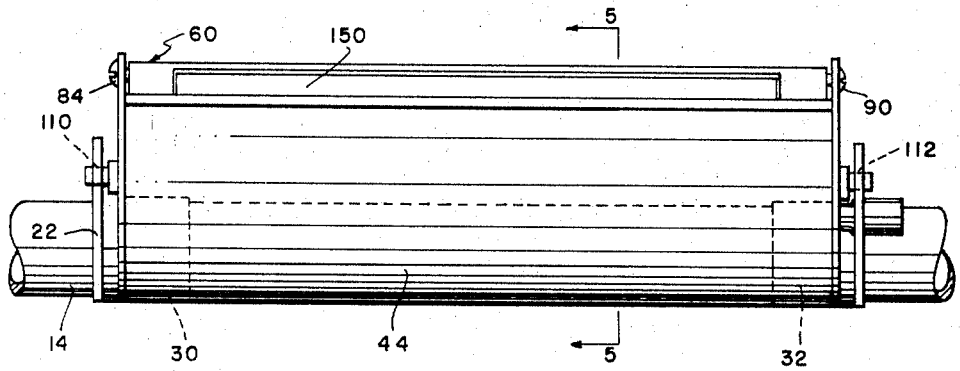
FIGURE 4 is a front elevational view of the structure shown in FIGURE 3, hidden details of the structure being shown in dashed outline.

Referring now to the drawings wherein like numerals designate like parts throughout the various views, the reference numerals 10 and 12 designate generally a pair of nested, nesting type, wheeled shopping carts, such carts being in common use in so-called supermarkets for the convenience of customers in holding selected articles for purchase and for carrying such articles to a check-out stand. Also as is conventional, each of the shopping carts 10 and 12 includes at its rear uppermost extremity a horizontal transversely extending tubular member, or push bar 14 which in the use of the cart by a customer is grasped by the hand or hands for the purpose of propelling and guiding movement of the cart. On reference to FIGURE 2 it will be appreciated by those conversant with shopping carts such as are conventionally used in so-called self-service or supermarkets that the carts 10 and 12 are identical and that similar carts can be nested into the rear end of the cart 10 and the forward end of the cart 12 can be nested into similar carts. It will also be appreciated that only the ends of the push bars 14 are visible in the side elevational view constituting FIGURE 2, and it is important to note that the push bars 14 of the carts 10 and 12 are parallel to each other when such carts are nested, and that at least some degree of fore and aft spacing exists between the push bars 14 of the nested carts 10 and 12. It is upon the transverse central portions of the push bars 14 that the ash receptacles constituting the subject matter of the present invention are mounted, the structure heretofore described being entirely conventional.

The ash receptacle of this invention can be centrally mounted upon the transverse extent of a push bar 14 so as to be disposed rearwardly of the push bar 14 supporting the same with the result that the ash receptacle will be disposed in the space between the push bars 14 of two nested carts and being mounted upon the forwardmost of such two push bars 14. Such rearwardly mounting of an ash receptacle designated generally at 18 is shown in FIGURE 2 in conjunction with the shopping cart 10. Conversely, an ash receptacle can be mounted to be forwardly of the push bar 14 on which it is mounted so that when shopping carts are nested, the ash receptacle will be disposed in the space intermediate the push bars 14 of two nested shopping carts while being mounted upon the rearmost of such push bars 14. The latter spatial relationship of an ash receptacle to the push bar 14 on which the same is mounted is shown with respect to an ash receptacle designated generally at 20 relative to the push bar 14 of the shopping cart 12. Though not shown, when the horizontal parallel spacing of the push bars 14 of nested shopping carts is very limited, ash receptacles according to the present invention may if desired be mounted on the push bars 14 so as to be disposed more or less directly above or below the push bars 14, as will become evident during the ensuing description of the ash receptacle of this invention.

Since the means for mounting the ash receptacle 20 in the position shown thereof with respect to the push bar 14 of the shopping cart 12 will be abundantly evident to those skilled in the art after acquiring an understanding of the structure of the ash receptacle 18 and the mounting and relationship of the same to the push bar 14 of the shopping cart 10, it will suffice to describe only the latter; the sole purpose of having made reference to the spatial relationship of the ash receptacle 20 to the shopping cart 12 having been to make it evident and to have emphasized the fact that the ash receptacle should be mounted upon the push bar 14 so as to best enable taking advantage of space available about a push bar 14 when carts of the type of which it forms a part are nested together.

For an understanding of the ash receptacle 18 and the means whereby the same is mounted upon the push bar 14, attention is directed to FIGURES 1 and 3 through 7. A pair of generally L-shaped brackets 22 and 24 are provided, such brackets respectively including planar legs 26 and semi-cylindrical legs 30 and 32. The concave sides of the legs 30 and 32 are the sides opposite the planar legs 26 and 28 and have a curvature such as to match the cylindrical external curvature of the push bar 14. The brackets 22 and 24 are spaced equal distances from the center of the push bar 14, it being understood that the spacing of the legs 26 and 28 is substantially less than the length of the push bar 14, whereby ample extents of the opposite end portions of the push bar 14 remain exposed and available for grasping by the customer using the cart 10. The brackets 22 and 24 are disposed on the rearmost side of the push bar 14 so that the legs 26 and 28 extend rearwardly, and so that the legs 30 and 32 extend towards each other as shown.

The legs 30 and 32 are each provided with threaded openings 34 therethrough, which are in alignment with diametrically opposed and slightly larger openings 36 and 38 through the walls of the tubular push bar 14. Threaded bolts 40 and 42 slidably extend through the pairs of openings 36 and 38 rearwardly and are in threaded engagement with the threaded openings 34 of the bracket legs 30 and 32, whereby the brackets 22 and 24 are drawn into snug engagement against the rear surface of the push bar 14 by the headed ends of the bolts 40 and 42 bearing against the front surface of the push bar 14.

The ash receptacle 18 comprises an elongated body or side wall 44 which is in section (see FIGURE 5) of a partial cylindrical configuration from an upper front edge 46 (remote edge from the standpoint of the user of the cart 10 provided with the receptacle 18) to a rear edge 48 (near edge from the standpoint of the user of the cart 10), and the body or side wall 44 is thence bent to extend rearwardly as indicated at 50 to terminate in a free edge 52. The extending portion 50 of the body 44 constitutes a lip or a prong immediately adjacent to the opening to the interior 54 of the receptacle, such opening to the interior of the receptacle being considered as the space intermediate the edges 46 and 48 of the side wall or elongated body 44. In the preferred construction the sheet metal of which the body 44 is constructed is preferably beaded or turned upon itself for purposes of avoiding sharpness and for additional strength and rigidity at the edge 46 and at the free edge 52, as indicated respectively at 56 and 58. In the preferred construction, the body 44 is of sheet metal as indicated previously and is of integral construction, and can be readily fabricated by the use of conventional sheet metal bending and forming machines and procedures. Preferably, the same is made of stainless steel, or of conventional sheet steel stock which after forming is plated over all its external surfaces to present a chromium or nickel finish that is resistant to corrosion, appealing to the eye and easy to clean. Similarly, the brackets 22 and 24 as well as the bolts 40 and 42 can be made of stainless steel, or plated steel.

A cover is provided for the previously defined opening to the interior 54 of the receptacle 18, such cover 60 is, when in its receptacle 18 closing position (see FIGURE 5), of an inverted V configuration of integral construction. The cover 60 is comprised of a forwardly and downwardly inclined side 62 that terminates in a downwardly bent terminal edge portion 64 that overlaps the body 44 at the edge 46 thereof, when the cover 60 is in its closed position as shown in FIGURE 3. The cover 60 also includes a rearwardly and downwardly inclined portion or wall 66 that joins with the cover portion or wall 66 at the apex 68 of the cover 60. The rearmost edge of the cover portion 66 terminates in a downturned edge portion 70 that terminates in close working proximity to the bend or fold 48 in the body or side wall 44 when the cover 60 is in its receptacle closing position shown in FIGURE 5.

Figures 5, 6:
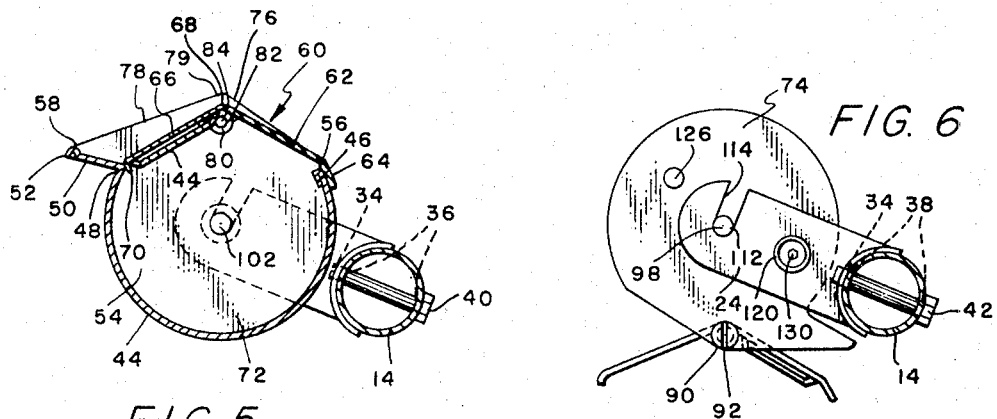
FIGURE 5 is a transverse sectional view taken upon the vertical plane indicated by the section line 5—5 in FIGURE 4.
FIGURE 6 is an end view of the ash receptacle shown in the preceding figures, the receptacle being shown as being oscillated to its ash discharging position, and the tubular push bar being shown in section.

The receptacle 18 is provided with end walls 72 and 74. As clearly shown in FIGURE 5, the end wall 72 has a periphery corresponding to the transverse section of the body 44, and the end wall 72 is peripherally joined to an end of the body 44, as by brazing or the like. It will be noted that such peripheral connection or joining of the end wall 72 to the body 44 is continuous from the edge 46 to the free edge 52 of the lip or apron portion 50. The peripheral configuration of the end wall 72 extends upwardly in an inverted V configuration from the edges 46 and 52 as defined by end wall edges 76 and 78 to converge at an obtuse internal angle or apex 79 disposed at a position of slightly greater height than the apex 68 of the cover 60 when the latter is in its receptacle closing position as shown in FIGURE 5. It will be understood in the light of the ensuing description of the oscillatory mounting of the cover with respect to the receptacle that the spacing of the end walls 72 and 74 is slightly greater than the corresponding dimension of the cover 60 as the latter is disposed between the end walls 72 and 74 and has working clearance with respect to such walls.

A short internally threaded sleeve 80 is brazed or otherwise fixedly secured to the underside of the cover 60 at the apex 68 thereof and immediately adjacent the end of the cover 60 nearest the end wall 72. An opening 82 is provided through the end wall 72 in alignment with the threaded opening in the sleeve 80, and a headed, threaded fastener 84 is extended through the opening 82 in the end wall 72 and threaded into the sleeve 80, the opening 82 being sufficiently oversized so as to constitute a bearing for the fastener 84 extending therethrough. If desired or deemed expedient, the sleeve 80 can be only partially threaded therethrough, so that the headed fastener 84 can be screwed up tight thereinto without the head bearing snugly against the end wall 72 in such a manner as to impair relative rotation of the fastener 84 with respect to the end wall 72. Means corresponding to the sleeve 80, the opening 82 and the headed threaded fastener 84 is provided at the other end of the cover 60 for oscillatably mounting the cover 60 to the end wall 74, the axis of oscillation of the latter means being in alignment with the axis of the fastener 84, and the headed fastener of such latter mentioned means being indicated at 90. It will be noted that the headed fasteners 84 and 90 are provided with a kerf such as indicated at 92, whereby, if desired, the cover 60 can be removed for repair or replacement, and its use even dispensed with entirely in the use of the receptacle 18 when deemed expedient. The easy replacement of the cover 60 enables a cover 60 to be employed with the receptacle 18 on which distinctive engraving or labeling may appear without it being necessary to replace the entire assembly. As will be made abundantly clear subsequently, this is quite advantageous in that the cover 60 is disposed at a position conspicuously displayed to the user of the cart 10, and indeed almost certainly must be viewed by a person desiring to make use of the receptacle 18.

As thus far described, the cover 60 can be oscillated from its closing position shown in FIGURE 5 in a counterclockwise direction which will serve the portion 66 thereof to a position enabling ashes, butts, gum wrappers, and the like to be passed over the lip or apron 50 and into the interior 54 of the receptacle 18. Such oscillation may be effected by applying a slight downward pressure upon the wall or portion 66 of the cover 60. Upon the cessation of the application of a downward pressure against the cover portion 66, the cover 60 will oscillate in a clockwise direction to return to its normal receptacle closing position by virtue of the fact that the center of mass of the cover 60 is downward and forwardly of the axis of oscillation, this being due to the fact that the cover 60 is of inverted V configuration and the cover portion 62 being made larger and extending farther from the axis of oscillation than is the case with respect to the cover portion 66.

As will be evident upon inspection of FIGURES 1 and 6, the end wall 74 has a periphery identical to that of the end wall 72, and is similarly joined to the body 44.

Means is provided for oscillatably mounting the receptacle 18 upon the brackets 22 and 24, and such means comprises the end walls 72 and 74 being provided with aligned and oppositely extending trunnions 96 and 98, respectively, such trunnions being concentric with the cylindrical portion of the configuration of the body 44. Such trunnions 96 and 98 are fixedly secured to the end walls 72 and 74 by means of welding or brazing if desired. Preferably, each of the trunnions is constituted of a pin having an intermediate portion 100 that is radially enlarged, and such radially enlarged portions abut the remote surfaces of the end walls 72 and 74 with their adjacent ends extending through suitable openings in the end walls and being peened as indicated at 102 at their adjacent ends against the adjacent surfaces of the end walls 72 and 74 in a rivet-like manner.

The receptacle 18 is disposed between the brackets 22 and 24 with the end walls 72 and 74 juxtaposed thereto. The legs 26 and 28 of the brackets 22 and 24 are provided with openings 110 and 112 through which the remote end portions of the trunnions 96 and 98 are respectively rotatably received. The dimensions of the relatively enlarged portions 100 of the trunnions are sufficiently large with respect to the openings 110 and 112 to constitute a means for spacing the end walls 72 and 74 from their respectively adjacent brackets 22 and 24. At least one of the brackets 22 and 24, and specifically the bracket 28 in the illustrated embodiment of the invention is provided with an upwardly inclined slot 114 from the opening 112, such slot 114 being for the purpose of enabling disengagement of the trunnion 98 from the bracket 24. It is not essential that the slot 114 extend straight upwardly from the opening 112, but it is much preferred that the slot 114 or the angular relationship of the bracket 24 with respect to the push bar 14 be such that the slot 114 has at least an upwardly inclination from the opening 114 so that the trunnion 98 will be cradled against downward gravitational movement.

In the preferred construction, the spacing of the end walls 72 and 74 from the brackets 22 and 24 and the length of the trunnion 96 is such that the trunnion 96 can be disengaged from the opening 110 by axial movement of the trunnion 96 from the opening 110 after the right-hand end (as viewed in FIGURE 2) of the receptacle 18 has been elevated a sufficient extent to clear the bracket 24, as will be appreciated. However, if desired and for reasons mentioned subsequently if theft or pilferage of the receptacle 18 is not deemed to be a problem, the leg 26 of the bracket 24 can also be provided with a slot 116 generally corresponding to the previously described slot 114.

By virtue of the previously described oscillatable mounting of the receptacle 18 upon the brackets 22 and 24, the receptacle 18 is oscillatable between an upright or refuse discharging position shown thereof in FIGURE 6, the movement from the receiving position to the discharging position being in a counterclockwise direction as viewed in FIGURES 5 and 6. It is to be noted that in the preferred construction the spacing of the receptacle 18 from the push bar 14 is such in relation to the extent of the lip or apron 50 that counterclockwise movement of the receptacle from its receiving to discharging position in a clockwise direction is limited by engagement of the lip 50 with the brackets 22 and 24.

It is to be noted that the receptacle 18 is in an unstable condition with respect to its axis of oscillation when in its ash receiving position shown in FIGURE 5, this being for the reason that when in such receiving position, the center of mass of the ash receptacle is upwardly and rearwardly of the axis of oscillation, this as a consequence of the weight of the material constituting the lip or apron 50 and the portions of the end walls 72 and 74 connected to and immediately adjacent such lip 50. With this in mind, except for the provision of means to prevent such an occurrence, the receptacle 18 when in the position shown thereof in FIGURE 5 will oscillate by the action of gravitational forces to the position shown thereof in FIGURE 6. During such oscillation or counterclockwise movement of the receptacle 18, the axis of oscillation of the cover 60 will pass along a path that moves counterclockwise relative to the center of mass of the cover 60, whereupon the cover 60 will through the action of gravitational forces oscillate counterclockwise relative to the body 44 of the receptacle 18 to assume the position shown thereof in FIGURE 6. It will be evident that upon the receptacle 18 and its cover 60 being disposed in the position shown thereof in FIGURE 6, the contents or refuse which had been previously deposited within the receptacle 18 will be discharged from the interior of the receptacle 18. Such discharge is facilitated by the smooth internal contours of the receptacle 18 so that a virtually complete emptying thereof is assured. It should be noted at this point that if the body 44 is manually restored to the position shown thereof in FIGURE 5 by imparting a clockwise movement thereto, the cover 60 will remain in a counterclockwise displaced position with the portion 62 thereof resting upon the lip or apron 50, in which condition the cover portion 66 extends upwardly from the receptacle 18 as a visible indication of flag that an emptying or discharging cycle of the receptacle 18 has been effected. The cover 60 will remain in such indicating condition until the same has been manually oscillated from such indicating position to the position shown thereof in FIGURE 5.

In view of the instability of the receptacle 18 when in its normal or refuse receiving position shown in FIGURE 5, means is provided for releasably retaining the receptacle 18 in its unstable, upright refuse receiving position, and it is preferred that such means serve the dual function of prohibiting or inhibiting pilferage of the receptacle 18 by way of detaching the same from the mounting brackets 22 and 24. The means provided for selectively retaining the receptacle in its receiving position comprises an internally threaded tubular member 120 extending through a suitable opening in the leg 28 of the bracket 24, such internally threaded tubular member 120 being fixedly secured to the bracket 24 by brazing or the like. The internally threaded tubular member 120 is spaced from the opening 112 and is preferably disposed at a position on the bracket 24 intermediate the opening 112 and the leg 32 of the bracket 24. In any event the tubular member 120 has a spacing from the opening 112 that is less than the radius of the cylindrical portion of the body 44. The end wall 74 is provided with an opening 126 therethrough at a position that is in alignment with the axis of the internally threaded tubular member 120 when the receptacle 18 is oscillated to its receiving position shown in FIGURE 5, and as will be seen presently, the opening 126 constitutes a latchkeeper. An elongated latch element 128 is provided for coaction with the latchkeeper 126, the latch element 128 being disposed in the tubular member 120 and movable in a direction parallel to the axis of the trunnions 96 and 98 intermediate positions such as to extend into and be withdrawn from the latchkeeper 126 when the latter is in alignment with the tubular member 120. The latch element 128 is externally threaded and is in threaded engagement with the internally threaded tubular member 120, the relationship being such that threaded turning movement of the latch element 128 will cause the latch element 128 to move into and out of latching engagement with the latchkeeper 126. The longitudinal extent of the latchkeeper 128 is such that the end thereof remote from the ash receptacle 18 is within the confines of the tubular member 120 when the latch element 128 is in latching engagement with the latchkeeper 126. In order that threaded turning of the latch element 128 can be effected, the end thereof remote from the receptacle 18 is provided with a noncircular recess 130, whereby an appropriately shaped tool (not shown) can be inserted into the recess 130 and the desired movement of the latch element 128 be thereby effected through the use of the tool. While the noncircular recess 130 can be in the form of a conventional slot or curve or in the cruciform configuration used with Phillips screwdrivers, it is preferred that the same be hexagonal such as for use with Allen-type wrenches as shown, however, the recess 130 can even more preferably be given a special configuration such as to require the use therewith of a special and less conventional tool. The purpose of such special configuration of the recess 130, especially such as to require a special tool is for the purpose of preventing or at least greatly inhibiting unauthorized persons from being able to move the latch element 128 from latching engagement with the latchkeeper 126.

It is to be particularly noted that when the latch element 128 is in latching engagement with the latchkeeper 126, not only is oscillation of the receptacle 18 positively prevented but also the trunnion 98 cannot be removed from engagement with the bracket 24 through the slot 114 by reason of the fact that the opening 112 is more closely spaced to the latchkeeper 126 than is the end of the slot 114 remote from the opening 112. Accordingly, the latch element 128 can be caused to serve the dual function of preventing inadvertent dumping of the ash receptacle 18 as could be occasioned by the prying and inquisitive fingers of children accompanying their parents while shopping, but also positively prevents disengagement of the receptacle 18 from the brackets 22 and 24 when the slot 116 is omitted as previously suggested in connection with preventing theft or pilferage.

It will be observed that authorized personnel can by the use of a special tool cause disengagement of the latch element 128 from the latchkeeper 126, whereupon the receptacle 18 will gravitationally oscillate to its discharging position, so that such personnel may collect from the receptacle 18 accumulated trash and refuse in a collection vessel (not shown) which had been inserted or placed under the receptacle 18 prior to release of the latch element 128. It is recognized that the accumulation of heavy refuse or trash within the receptacle 18 may tend to offset the previously mentioned instability of the receptacle 18, and it is therefore within the scope of the present invention that the axis of oscillation of the receptacle 18 can be positioned at a location downwardly from that shown in FIGURE 5 so as to increase the desired degree of instability for the automatic dumping function that occurs on release of the latch element 128.

The cover 60 as well as the latching means are preferably made of stainless steel, or steel coated or plated in a manner such as previously described in connection with the body 44.

In order to display information to the conspicuous view of the customer, the preferred form of the invention includes provision for mounting an indicia bearing medium. Such means comprises the portion 66 of the cover 60 being slotted at 140 and 142, with the rectangular area 144 of the portion 60 between the slits 140 and 142 being downwardly struck, whereby a rectangular sheet of an indicia bearing material or medium 150 can be placed on the upper surface of the area 144, with its opposite end portions 152 and 154 extending through the slits 140 and 142 and underlying the portion 60 for purposes of retention. The indicia bearing sheet or material 150 can have any desired character of indicia thereon, not shown, such as advertising matter of the merchant, an indication of specially sale priced goods, an index or map of the arrangement of goods within the shop or store, etc. Needless to say, as changing circumstances warrant, the merchant can from time to time replace the indicia bearing sheet 150 that is outdated with a corresponding sheet with current indicia thereon.

Figures 7, 8:
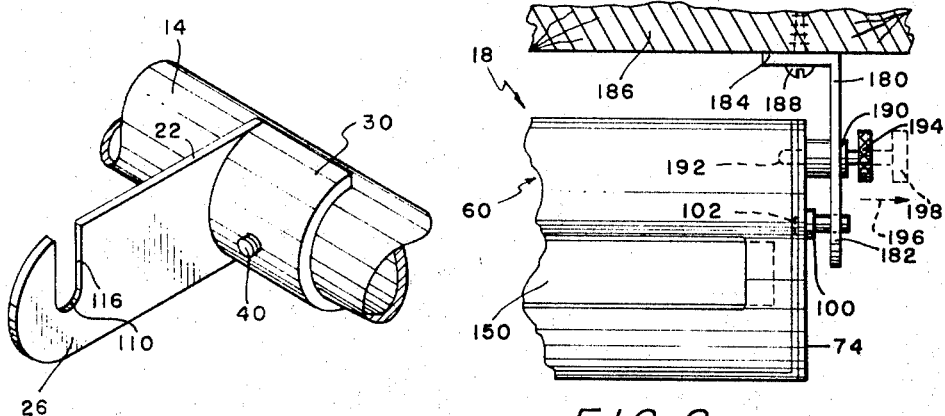
FIGURE 7 is an enlarged isometric detail view of the means provided for detachably securing one of the brackets to the push bar (partially shown) of the shopping cart, not shown.
FIGURE 8 illustrates a modification of the invention, wherein a bracket is employed suitable for mounting upon a wall surface, and wherein a different structure is provided for latching the ash receptacle in its upright, ash receiving position.

Attention is now directed to the modified form of the invention shown in FIGURE 8, this embodiment of the invention differing from the previously described embodiment of the invention solely in two particulars, namely, a different form of brackets from the previously described brackets 22 and 24, and in the provision of a differing latch element and mounting means for the latch element. The different bracket embodiment is designated at 180, the same including a leg 182 that corresponds to the previously described bracket leg 32. The essential difference between the modified bracket 180 and the previously described bracket 24 resides in the bracket leg 194 being of a planar, rather than arcuate form, whereby the bracket 180 can be directly mounted to a flat vertical wall 186 by means of a fastening screw 180 extending through a suitable opening in the bracket leg 184 and into the wall 186. It will be abundantly clear that a corresponding modification of the bracket 22 is made for oscillatably supporting the other end of the receptacle 18 and illustration and description thereof is seen to be unnecessary to accomplish a full and complete understanding thereof on the part of those skilled in the art.

Passing now to the sole remaining distinction of the embodiment of the invention shown in FIGURE 8 from the previously described embodiment of the invention, a hollow housing 190 is mounted on the bracket 180 in lieu of the previously described tubular member 120, and an elongated latch element 192 is reciprocably mounted in and through the housing 190, the same being reciprocal between positions in and out of latching engagement with the latchkeeper 126. The end of the elongated latch element 192 remote from the receptacle 18 is provided with a headed end portion 194 which can be moved in the direction indicated by the arrow 196 to the dashed line position shown thereof at 198, the dashed line position thereof corresponding to the latch element 192 being out of latching engagement with the latchkeeper 126. The housing 190 is of conventional character and includes therein spring means (not shown) yieldingly urging movement of the latch element 192 in a direction opposite to that indicated by the arrow 196, that is, in a direction corresponding to moving the latch element 192 from a non-latching to a latching position.

In operation the sole distinction between the use and operation of the embodiment of the invention shown in FIGURE 8 from that previously described is that the receptacle 18 can be permitted to dump or discharge its contents without the use of any special tool merely upon grasping the headed end portion 194 and pulling the same in the direction indicated by the arrow 196, whereupon the ash receptacle 18 will discharge in the previously described manner. While unauthorized personnel can operate the latching means shown in FIGURE 8, the same does enjoy the advantage of not requiring any special care in aligning the latchkeeper or opening 126 with the latch element 192 on restoring the receptacle 18 to its normal position of use, this being due to the fact that upon oscillating the ash receptacle slowly toward its receiving position, the free end of the latch element 192 will automatically fall into latching position by virtue of the spring means upon the opening 126 moving into alignment therewith.

It is deemed quite evident that the illustrated and described preferred embodiments of the invention are susceptible to numerous variations in detail without departing from the spirit of the invention. For example, the use of the threaded fasteners 40 and 42 can be dispensed with as well as the necessity for openings therefor through the push bar 14 by the simple expedient of securing the bracket portions 30 and 32 to the push bar 14 by means of conventional clamps such as hose clamps or the like, and indeed such may even be preferable in applying the mounting brackets to extant carts 10 and enabling such attachment by unskilled persons and not to require the drilling of any holes. Furthermore, such alternative mode of attachment would facilitate angular adjustment of the brackets about the push bar 14 as occasions or personal preferences might dictate.

We claim:

1. An ash receptacle and mounting means therefor comprising first and second brackets provided with means adapting the brackets to be secured to a support with the brackets in horizontally spaced and fixed relationship to each other, a receptacle including horizontally spaced first and second end walls at opposite extremities thereof, said receptacle being disposed between the brackets and having its first and second end walls juxtaposed with the first and second brackets, respectively, means pivotally mounting the first and second end walls upon the first and second brackets about a common horizontal axis, respectively, whereby the receptacle can be oscillated from an upright to a tilted position, said receptacle having an opening disposed intermediate said end walls whereby ashes may be received in and discharged from the receptacle when the latter is in its upright and tilted positions respectively, means extending through the first bracket and actuable from the side of the latter remote from the first end wall for selective engagement with the latter for releasably retaining the receptacle in its upright position, and said receptacle including a cover for the opening therein, means for mounting the cover on the receptacle for oscillation about a cover axis that is parallel to the horizontal axis and eccentrically disposed with respect to the center of mass of the cover, said cover at least partially closing the opening in the receptacle when the latter is in its upright position.

2. The combination of claim 1, wherein said means pivotally mounting the end walls upon the brackets comprises the end walls being provided with oppositely extending trunnions, said brackets being provided with aligned openings rotatably receiving the trunnions, and at least one of said brackets having a slot extending from the opening therein enabling the trunnion received therein to be disengaged from such bracket.

3. The combination of claim 1, wherein the means for releasably retaining the receptacle in its upright position comprises said first bracket having an opening therethrough that is radially spaced from said axis, said first end wall having a recess therein that is in alignment with said opening in the first bracket when the receptacle is in its upright position, such recess constituting a latchkeeper, and a latch element movable through said opening in the first bracket for selective engagement in said recess.

4. The combination of claim 3, wherein said receptacle is provided with means for holding and displaying to view an indicia bearing medium on the exterior thereof.

5. The combination of claim 3, wherein said latch element is provided with means for resiliently biasing the same toward engagement with the recess.

6. An ash receptacle and mounting means therefor comprising first and second brackets provided with means adapting the brackets to be secured to a support with the brackets in horizontally spaced and fixed relationship to each other, a receptacle including horizontally spaced first and second end walls at opposite extremities thereof, said receptacle being disposed between the brackets and having its first and second end walls juxtaposed with the first and second brackets, respectively, means pivotally mounting the first and second end walls upon the first and second brackets about a common horizontal axis, respectively, whereby the receptacle can be oscillated from an upright to a tilted position, said receptacle having an opening disposed intermediate said end walls whereby ashes may be received in and discharged from the receptacle when the latter is in its upright and tilted positions respectively, means extending through the first bracket and actuable from the side of the latter remote from the first end wall for selective engagement with the latter for releasably retaining the receptacle in its upright position, said means for releasably retaining the receptacle in its upright position comprising said first bracket having an opening therethrough that is radially spaced from said axis, said first end wall having a recess therein that is in alignment with said opening in the first bracket when the receptacle is in its upright position, such recess constituting a latchkeeper, a latch element movable through said opening in the first bracket for selective engagement in said recess, and said receptacle including a cover for the opening therein, means for mounting the cover on the receptacle for oscillation about the cover axis that is parallel to the horizontal axis and eccentrically disposed with respect to the center of mass of the cover, said cover at least partially closing the opening in the receptacle when the latter is in its upright position.

7. An ash receptacle and mounting means therefor comprising first and second brackets provided with means adapting the brackets to be secured to a support with the brackets in horizontally spaced and fixed relationship to each other, a receptacle including horizontally spaced first and second end walls at opposite extremities thereof, said receptacle being disposed between the brackets and having its first and second end walls juxtaposed with the first and second brackets, respectively, means pivotally mounting the first and second end walls upon the first and second brackets about a common horizontal axis, respectively, whereby the receptacle can be oscillated from an upright to a tilted position, said receptacle having an opening disposed intermediate said end walls whereby ashes may be received in and discharged from the receptacle when the latter is in its upright and tilted positions respectively, means extending through the first bracket and actuable from the side of the latter remote from the first end wall for selective engagement with the latter for releasably retaining the receptacle in its upright position, said means for releasably retaining the receptacle in its upright position comprising said first bracket having an opening therethrough that is radially spaced from said axis, said first end wall having a recess therein that is in alignment with said opening in the first bracket when the receptacle is in its upright position, such recess constituting a latchkeeper, a latch element movable through said opening in the first bracket for selective engagement in said recess, said opening in the first bracket being internally threaded and said latch element being externally threaded and threaded in said opening, said latch element having a terminal end portion remote from the first end wall entirely disposed within the opening when the latch element is engaged with the latchkeeper, and said latch element end portion having a noncircular recess adapted to receive a tool, whereby unauthorized disengagement of the latch element from the latchkeeper is made difficult.

8. The combination of claim 7, wherein said means for pivotally mounting the receptacle includes the first end wall having a trunnion and the first bracket having an opening rotatably receiving the trunnion, and said first bracket havig a slot extending from the opening therein, whereby the trunnion can be disengaged from the first bracket when the latch element is disengaged from the recess.

9. A self-service type shopping cart having a transversely extending horizontal push bar at the upper rear end thereof and such that a plurality of carts can be nested with the push bars thereof in spaced parallelism, and in combination with said cart the improvement comprising first and second brackets mounted in horizontally spaced relation on and extending laterally from the push bar, an ash receptacle including horizontally spaced first and second end walls at opposite extremities thereof, said receptacle being disposed between the brackets and having its first and second end walls juxtaposed with the first and second brackets, respectively, means pivotally mounting the first and second end walls upon the first and second brackets, respectively, about an axis spaced from and parallel to the push bar, whereby the receptacle can be oscillated from an upright to a tilted position, said receptacle having an opening disposed intermediate said end walls whereby ashes may be received in and dumped from the receptacle when the latter is in its upright and tilted positions, respectively, and means for releasably securing the receptacle in its upright position.

10. The combination of claim 9, including means for mounting an indicia bearing medium on the exterior of the receptacle, whereby a shoppers guide, advertising matter and the like can be conspicuously displayed to the cart user's view.

11. The combination of claim 9, including a cover for the opening in the receptacle, means for mounting the cover on the receptacle for oscillation about a cover axis that is parallel to the first mentioned axis and eccentrically disposed with respect to the center of mass of the cover, said cover at least partially closing the opening in the receptacle when the latter is in its upright position.

12. The combination of claim 9, wherein the means for pivotally mounting the end walls upon the brackets comprises the end walls being provided with trunnions and the brackets having openings rotatably receiving the trunnions, with at least one of the brackets having a slot communicating with the opening therein.

References Cited

UNITED STATES PATENTS

| | | | |
|---|---|---|---|
| 2,575,441 | 11/1951 | Burnett | 220—18 |
| 2,687,589 | 8/1954 | Brockway. | |
| 2,888,761 | 6/1959 | Miller | 280—33.99 |
| 2,959,317 | 11/1960 | Aldridge | 220—18 X |
| 3,235,212 | 2/1966 | Baumiller | 220—18 X |

FOREIGN PATENTS 256,088   8/1926   Great Britain.

BENJAMIN HERSH, *Primary Examiner.*

MILTON L. SMITH, *Assistant Examiner.*

U.S. Cl. X.R.

206—19.5, 18; 248—202